United States Patent [19]

Wang et al.

[11] Patent Number: 4,820,503
[45] Date of Patent: Apr. 11, 1989

[54] CATALYTIC HOLLOW SPHERES

[75] Inventors: Taylor G. Wang, Glendale; Daniel D. Elleman, San Marino; Mark C. Lee, La Canada; James M. Kendall, Jr., Pasadena, all of Calif.

[73] Assignee: California Institute of Technology, Pasadena, Calif.

[21] Appl. No.: 740,733

[22] Filed: Jun. 13, 1985

Related U.S. Application Data

[62] Division of Ser. No. 602,901, Apr. 23, 1984, Pat. No. 4,576,926.

[51] Int. Cl.$^4$ ................................................ C01C 1/04
[52] U.S. Cl. ................................... 423/362; 518/728; 585/250; 585/477; 585/502; 585/664; 585/734; 208/46
[58] Field of Search ................... 423/362; 208/46; 518/728; 585/250, 477, 502, 664, 734

*Primary Examiner*—Curtis R. Davis
*Attorney, Agent, or Firm*—Marvin E. Jacobs

[57] ABSTRACT

The improved, heterogeneous catalysts are in the form of gas-impervious, hollow, thin-walled spheres (10) suitably formed of a shell (12) of metal such as aluminum having a cavity (14) containing a gas at a pressure greater than atmospheric pressure. The wall material may be, itself, catalytic or the catalyst can be coated onto the sphere as a layer (16), suitably platinum or iron, which may be further coated with a layer (18) of activator or promoter. The density of the spheres (30) can be uniformly controlled to a preselected value within ±10 percent of the density of the fluid reactant such that the spheres either remain suspended or slowly fall or rise through the liquid reactant.

12 Claims, 2 Drawing Sheets

CATALYTIC HOLLOW SPHERES

ORIGIN OF THE INVENTION

The invention described herein was made in the performance of work under a NASA contract and is subject to the provisions of Section 305 of the National Aeronautics and Space Act of 1958, Public Law 83-568 (72 Stat 435; 42 USC 2457).

This a division of application Ser. No. 602,901, filed Apr. 23, 1984, now U.S. Pat. No. 4,576,926.

BACKGROUND OF THE INVENTION

The present invention relates to heterogeneous catalysts and more particularly, this invention relates to hollow, gas-impervious, catalytic spheres having a preselected density for the controlled and uniform conversion of catalytically reactive fluid materials.

STATEMENT OF THE PRIOR ART

The relative merits of homogeneous and heterogeneous catalysts are well known. Homogeneous catalysts have better defined active sites, usually have all of the metal available for catalysts, and offer steric and electronic environments of the metal atom that can, at least in principle, be varied at will. The major disadvantage of homogeneous catalysts is the need to separate them from reaction products without loss of their valuable metal content. This step can be both complex and expensive. Other disadvantages are that these catalysts are relatively easily deactivated through aggregation or by poisonous by-products or at extreme temperatures. Also, corrosion of reactors by metal complexes is common.

Heterogeneous catalytic processes are of great industrial importance. Annually, 10,000 metric tons of ammonia are produced by direct combination of nitrogen and hydrogen gases at 400° C. and high pressure over iron catalysts promoted by several percent $K_2O$ and $Al_2O_3$. Large volumes of sulfuric acid and methanol are also produced by heterogeneous catalysis. About 70 percent of all petrochemicals and refined petroleum products are produced by heterogeneous catalytic processes. Hydrogenation in presence of noble metals such as platinum or palladium or transition metals such as nickel or cobalt can be used to convert carbon monoxide to many different products such as ketones or alcohols, to convert olefins to alkanes, benzene to cyclohexane or nitro groups to amine groups. Transition metal catalysts also show activity for a wide variety of industrially important reactions such as isomerization, hydroformylation, carbonylation, etc. These catalysts can be used to convert pyrolysis coal gases into synthetic fuels such as oxo alcohols.

Heterogeneous catalysts have been developed in which the homogeneous catalyst is either impregnated onto or chemically bonded to a solid support. Reaction rate is also dependent on surface area, and many catalysts are provided in finely divided form such as fine powders of platinum prepared by reduction of the oxide. Catalysts are also prepared by impregnating the active catalyst onto high area supports, for example, platinum deposited onto alumina particles having surface areas of the order of 100 square meters per gram. Heterogeneous catalysts have been prepared by coating the catalyst onto a hollow, porous support.

Baer, et al. (U.S. Pat. No. 3,347,798) prepare hollow, catalytic beads having a diameter greater than 90 microns for a fluidized bed process. The beads are gas-permeable so that reactants can diffuse into the core and react with the inner wall. The beads are formed by spraying a hydrogel such as silicic acid or alumina containing a vaporizable expanding agent through a nozzle into a tower and impinging the stream with a gas heated to 300°-700° C. Pilch, et al. (U.S. Pat. No. 3,538,018) disclose an improvement over Baer, et al., in which compact catalyst particles are added to the hollow spheres to form a mixture having a controlled density. Ao (U.S. Pat. No. 3,798,176) manufactures controlled-density, catalyst pellets having a vacant or a dense center. Ao forms a vacant center pellet; a thin polymeric shell is coated with a carrier and catalyst particles. During calcination, the core burns away and the particles sinter and consolidate into a gas-permeable shell. In the dense center pellet, the core is made by pelletizing a ceramic. Martin (U.S. Pat. No. 3,978,269) forms porous pellets for automotive exhaust reactors by coating liquid droplets with a powder mixture of ceramic and binder and then firing to form a porous, breatheable, hollow pellet. Watson, et al. (U.S. Pat. No. 4,039,480) also form an automotive catalyst by coating a dry core with a dispersion of ceramic and firing to form a product having a bulk density below 50 lbs/ft$^3$. Barnes, Jr. (U.S. Pat. No. 4,292,206) incorporates tiny, hollow glass spheres in the alumina powder mix as a light-weight filler to reduce weight of the resultant catalyst beads.

These porous catalytic particles are not uniformly dispersed in the fluid reaction media. They require separation of the reactant and product from the catalyst. The ceramic or polymer supported catalyst particles tend to crack, corrode or decay, which clogs the catalyst bed and requires shutting the reactor down to replace the bed and incurs the expense of replacing the catalyst. Irregularly-shaped catalysts are not an optimum shape for catalytic reaction kinetics. The metal catalyst are heavy and would sink to the bottom of the reactor unless the reaction media is stirred or the catalyst circulated through it.

STATEMENT OF THE INVENTION

Improved heterogeneous catalysts are provided in accordance with the present invention. The catalysts of the invention have a uniform, controlled density that can be preselected such that the spheres disperse uniformly throughout a fluid reaction medium or rise or fall through the medium at a preselected rate. The catalyst particles of the invention are very strong and physically tough and will not crack, chip or abrade. The particles can be used and reused for numerous runs before requiring any regeneration or reprocessing. The catalyst of the invention provides a large surface area for optimum contact of reagent and catalyst while assuring unobstructed flow of reactants through the bed of catalyst.

The catalyst of the invention automatically distributes through the reagent or can flow through the body of reagent without requiring shaking, stirring or pumping. The catalyst particles are readily prepared in large volume and uniform shape at low cost by the process of the invention.

The improved catalyst provided by the present invention is in the form of gas-impervious, hollow, thin-walled spheres. The wall material may itself be catalytic or the catalyst can take the form of a coating onto the wall material. Additional layers of activators or promoters can be coated onto the sphere or the promoters or activators can be mixed into the layer of catalyst. The density of the spheres can be accurately controlled by controlling the internal gas pressure and/or wall thickness of the spheres to form a uniform batch of spheres in which the weight of the spheres varies less than ±5 percent.

Spheres that are from 0.5 to 10 percent by weight lighter than the reaction media will slowly rise at a controlled rate through the reaction media. Spheres that have substantially the same density (±0.01 to 0.5 percent by weight) as the reaction media will remain uniformly dispersed therein and spheres that are from 0.5 to 10 percent heavier than the reaction media will slowly fall through the media. The spheres can be produced over a fairly large range in diameter, such as from 0.20 to 5.0 millimeters and still provide sufficient surface area for the catalytic reaction to proceed at an economic rate.

The spherical catalysts are readily dispersed with a minimal amount of energy and can reject exothermic heat to the surrounding reaction media. The catalyst of the invention is easy to handle and readily separates from the reaction media for cleaning, reprocessing, regeneration or recirculation. There is no problem with packed beds or with fluid flow since the catalyst spheres maintain a uniform dispersion with separation between adjacent spheres. The catalysts of the invention provide optimum utilization of expensive catalyst materials since the catalyst materials are provided on the surface. The inner, inert core of the particles is filled with inert gas. The catalysts of the invention are applicable for all prior heterogeneous reactions such as hydrogenation, polymerization or oligomerization, isomerization, etc.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
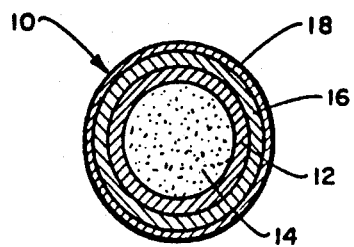
FIG. 1 is a cross-sectional view of a catalyst sphere according to the invention.

Referring now to FIG. 1, the catalyst of the invention is in the form of a hollow sphere 10 having a gas-impervious shell 12 formed of a metal. The hollow, interior cavity 14 contains a gas such as air under pressure. The presence of the gas and the thickness and weight of the shell and any promoter or initiator layers thereon are selected to provide a predetermined density in relation to the density of the fluid reaction media. The shell may be formed of a catalytically active metal such as platinum or iron or may be formed of another metal such as aluminum on which is coated a layer 16 of catalyst, e.g. platinum or iron. The catalyst layer 16 may be from 0.1 $\mu$m to 0.1 mm in thickness. The catalyst layer 16 may contain from 1 to 25 percent by weight of a promoter initiator such as an alkali metal oxide, or a thin layer 18 from 0.1 $\mu$m to 0.1 mm in thickness of the promoter, or the initiator may be coated onto the surface of the catalyst layer. The layers 16, 18 may be formed by deposition of the compounds from the vapor or liquid phase such as by thermal decomposition of metal carbonyls and the like.

Gas-filled, spherical, metal shells, that are dimensionally precise, smooth and of high strength can be produced by a method based on the hydrodynamic instability of an annular jet of molten metal as disclosed in U.S. Pat. No. 4,344,787, the disclosure of which is expressly incorporated herein by reference. The basis of the method rests upon the phenomenon of instability and breakup of a jet flow of liquid as it issues into a gaseous medium at rest. In the embodiment employed herein, a coaxial flow of fill gas is provided at the core of a circular jet by means of a thin-wall tube. When the axial velocities of the jet liquid and of the central gas are adjusted to fall within certain ranges, the jet exhibits an instability which generates large-amplitude axisymmetric oscillations. These culminate in a rapid pinchoff of the jet and in the formation of liquid shells which can be described as thick-wall bubbles. A remarkable feature of the instability is that it is more powerful by far than the familiar Rayleigh instability of a nonhollow jet.

The oscillation growth is so rapid that the nonlinear motion regime is attained within three or four jet diameters, and pinchoff ensures quickly. The motion is highly deterministic; although the action occurs spontaneously and without external stimulus, a frequency stability and corresponding uniformity in shell mass exceeding one part in $10^3$ is readily attained. As each shell in turn parts from its neighbors, it undergoes a ringing oscillation which has the beneficial effect of promoting a centering of captured gas.

The dimensions of shells produced by nozzles of this type may be varied over wide limits. In accordance with the physical process of shell formation, the diameter of the product will be approximately twice that of the jet orifice, whereas the relative wall thickness is not so simply determined. That quantity is not only a function of the aspect ratio of the annular passageway, but is simultaneously a function of the volume flow rate of the fill gas. An increase in the gas flow rate at fixed liquid rate results in an increase in the bubble formation frequency and in a concomitant decrease in wall thickness.

Tin and aluminum shells ranging in diameter from 750–2000 $\mu$m and wall thicknesses of about 25 $\mu$m have been formed in quantity. Here, the metal jet issued into ambient air. Examination of specimens was made by means of scanning electron micrography (SEM). For shells at the upper size limit, it was found that the specimens were spherical to within about one percent except near two diametrically opposing points from which the jet pinchoff had occurred.

Metallic shells have been produced by the jet instability method at rates up to a few thousand per second. The shells exhibit excellent uniformity in size, good sphericity over most of the surface and fair concentricity. The spheres have excellent surface quality and high tensile strength. The shells are then further coated with catalyst and promoter layers. As a specific example of practice, aluminum spheres about 2 mm in diameter, with a wall thickness of about 25 μm and an internal air pressure of about 100 psi could be coated with a 0.1 μm thick layer of platinum by reduction of precursor oxide powder. Palladium or nickel could also be coated onto the alluminum shell by this technique. These catalysts could be utilized for hydrogenation reactions. When the aluminum shell is coated with iron, the spheres can be utilized to produce ammonia by combining $N_2$ and $H_2$ gases at 400° C. and several hundred atmospheres of pressure. Further coating the iron layer with a layer of $Na_2O$ or $K_2O$ results in a synthesis gas conversion catalyst which converts CO and $H_2$ gases into product gas containing $CH_4$, $C_2H_6$, $C_3H_8$, $C_9H_{10}$, other alkanes, olefins, alcohols, aldehydes and acids.

Figure 2:
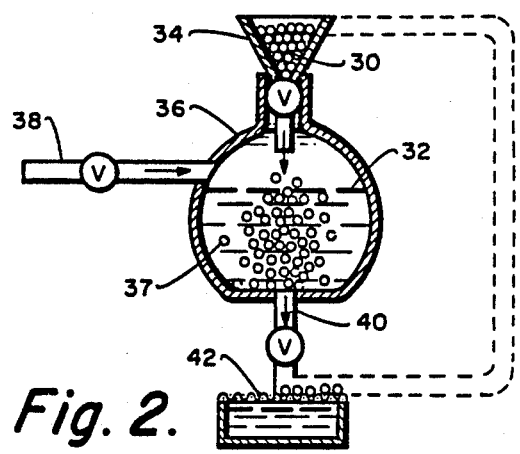
FIG. 2 is a schematic view of a batch reactor containing a uniform dispersion of catalyst spheres.

The ability to adjust the buoyancy of the uniformly-sized spheres make possible reaction processes in which the body of reactant is stationary and the catalyst moves through the reactant at a controlled rate, or is uniformly suspended therein. A process utilizing catalytic, hollow spheres 30 having a density differing from the liquid media 32 by ±0.1 to 0.5 weight percent is illustrated in FIG. 2. As the catalyst particles 30 are fed from the hopper 34 into the reactor 36, they will deploy to form a uniform suspension 37 within the body 36 of liquid reactant. This reactor can be operated as a batch reactor in which reactants are introduced through inlet 38 and are removed at the end of the run through outlet 40. The catalyst can be separated by means of a screen or filter 42 and recycled to the hopper 34.

Figure 3:
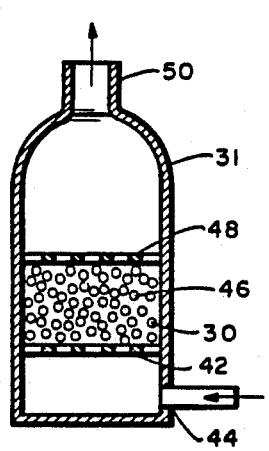
FIG. 3 is a schematic view of a fluidized bed reactor containing a bed of catalyst spheres.

Continuous flow processes can be operated by flowing reactant through a bed of catalyst restrained between porous barriers such as screens. The catalyst spheres may tend to pack against the upstream screen unless they are allowed to expand as in a fluidized bed reactor as shown in FIG. 3. The catalyst particles 30 are placed in the reactor 31 downstream of perforated plate 42. The gaseous or liquid fluid reactant is introduced through the inlet 44 placed upstream of the plate. The particles 30 expand by the action of the flowing stream to form a fluidized bed 46. A further screen or perforated plate 48 may be placed towards the top of the reactor to prevent any catalyst particles from being carried out the outlet 50 with the reaction products.

Figure 4:
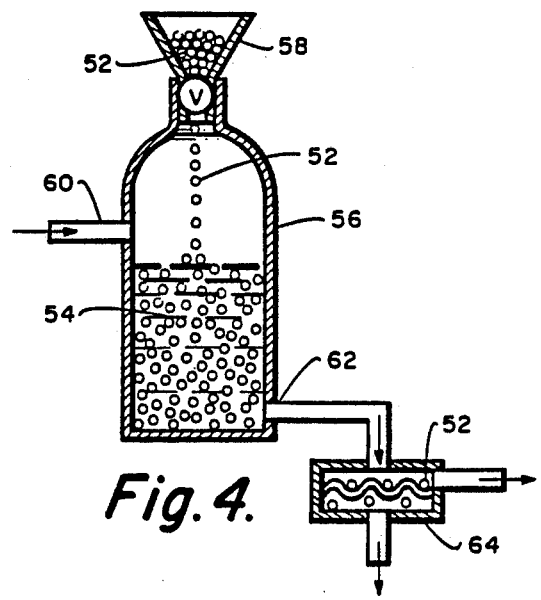
FIG. 4 is a schematic view of a reactor with a falling column of catalyst spheres.

A batch reactor with an autogeneously moving catalyst suspension is illustrated in FIG. 4. In this process, the catalyst particles 52 are of uniform size and density and have a density preselected to a value from 0.5 to 10 percent heavier than that of the liquid reactant media 54 within the reactor 56 so that the transit time of the particles within the reactor provides a desired degree of conversion of the reactants. As the catalyst spheres 52 deploy into the reaction media 54 from the hopper 58, they will form a uniform suspension which slowly falls to the bottom of the vessel at a controlled rate. Reactants can be intermittently or continuously fed to the reactor from the inlet 60 and reaction product can be intermittently or continuously removed through outlet 62 containing a liquid-solid separator 64 to remove catalyst particles 52 for recycle to the hopper 58.

Figure 5:
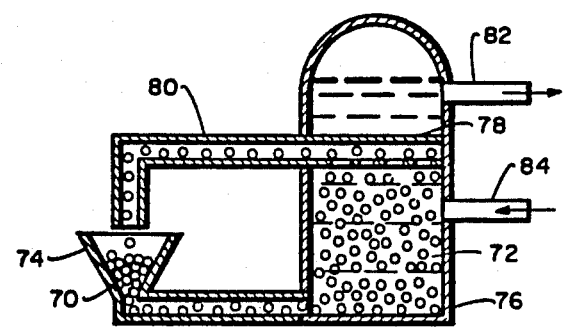
FIG. 5 is a schematic view of a reactor with a rising column of catalyst spheres.

FIG. 5 illustrates a batch or continuous process utilizing catalyst particles 70 which are lighter than the reaction media by 0.5 to 10 percent by weight and have a density preselected to provide a desired rate of travel of the particles through the column 72 of reactant. The spherical catalyst particles 70 are fed from a supply vessel 74 into the bottom of the reactor 76 and slowly rise as a suspension through the column 72 of reactant. The catalyst particles can be removed by a skimmer 78 and recycled through line 80 to the supply vessel 74. The reaction product can be recovered through an outlet 82 or by overflow intermittently or continuously. Similarly, reactant material can be introduced through the inlet 84 continuously or intermittently.

Figure 6:
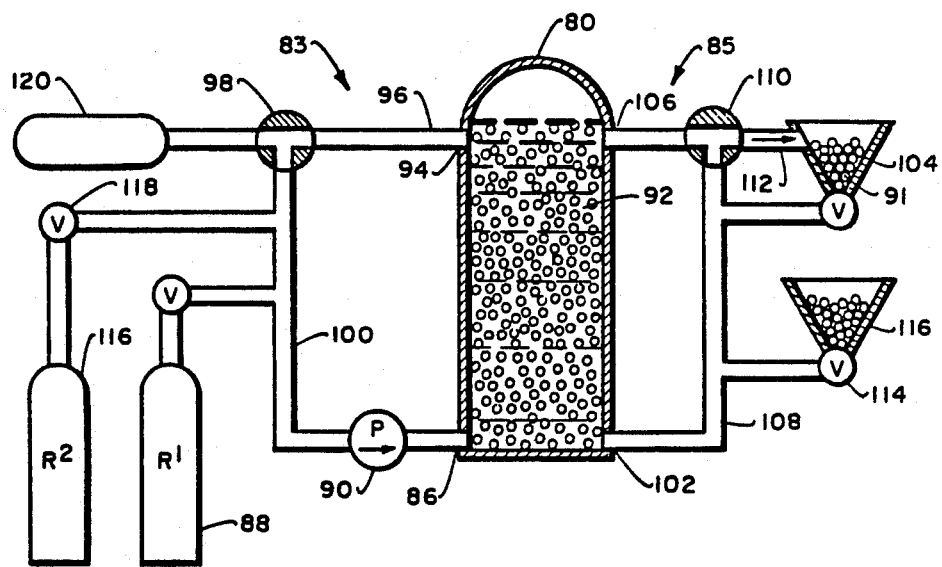
FIG. 6 is a schematic view of a continuous flow reactor with continuous circulation of catalyst and continuous introduction of reactant and removal of reaction product.

In the embodiment shown in FIG. 6, the catalyst suspension and reactant column move continuously under counter-current flow conditions. This process also illustrates use of two different catalysts for a two-stage process. The reactor 80 includes two circulation loops 83, 85. In the first loop 83, a first reactant, $R^1$, is fed into the inlet 86 from the supply tank 88 and pump 90 and forms a rising column 92 of reactant. First stage product can be removed through outlet 94 and recycled through line 96 to the inlet side of the pump 90 when the three-way valve 98 is turned toward the recycle line 100.

First stage catalyst 91 is fed into the inlet 102 of loop 85 from hopper 104, rises through the column 92 of reactant and is removed through outlet 106. The first stage catalyst is recycled through line 108 until the reaction is complete. Valve 110 is turned toward line 112 and all the first stage catalyst is returned to the hopper 104. Valve 114 is opened to feed second stage catalyst 116 into the loop 85 and reaction column 92. Additional reactant, $R^2$, may now be fed from tank 116 into inlet 86 by opening valve 118.

The three-way valve 98 is turned toward recycle. The second stage catalyst is cycled through the column 92 until the reaction is complete. The three-way valve is then turned toward vessel 120 and the second stage reaction product is recovered.

It is to be understood that only preferred embodiments of the invention have been described and that numerous substitutions, modifications, and alterations are permissible without departing from the spirit and scope of the invention as defined in the following claims.

We claim:

1. A reaction medium comprising a fluid reactant containing a uniform suspension of uniformly-sized, hollow, gas-impervious catalyst spheres in the form of a gas-impervious shell containing a gas at a pressure greater than atmospheric and having a layer of catalyst on the surface thereof, said spheres having a preselected density not varying more than ±10 percent of the density of the fluid reactant.

2. A reaction medium according to claim 1 in which the spheres have a density within ±0.5 percent of the density of the fluid reactant and form a uniform stationary suspension therein.

3. A reaction medium according to claim 1 in which the spheres have a density less than the density of the fluid reactant by 0.5 to 10 percent and form a suspension that slowly rises therethrough.

4. A reaction medium according to claim 1 in which the spheres have a density greater than the density of the fluid reactant by 0.5 to 1.0 percent and form a suspension that slowly falls therethough.

5. In a method of catalytically converting a fluid reactant into a product, the improvement comprising the steps of:

forming a uniform suspension of uniformly sized, hollow, gas-impervious catalytic spheres within a body of the fluid reactant, said spheres being in the form of a gas-impervious shell containing a gas at a pressure above atmospheric, having a layer of catalyst on the surface thereof and having a preselected density within ±10 percent of the density of the fluid reactant;

catalytically reacting the reactant by means of the catalyst layer to form a reaction product; and separating the catalyst spheres from the reaction product.

6. A method according to claim 5 in which the spheres have a density within ±0.5 percent of the density of the fluid reactant and form a uniform stationary suspension therein.

7. A method according to claim 5 in which the spheres have a density less than the density of the fluid reactant by 0.5 to 10 percent and form a suspension that slowly rises therethrough.

8. A method according to claim 5 in which the spheres have a density greater than the density of the fluid reactant by 0.5 to 10 percent and form a suspension that slowy falls therethrough.

9. A method according to claim 5 in which the diameter of the spheres is from 0.20 mm to 5.0 mm.

10. A method according to claim 9 in which the spheres are formed of metal.

11. A method according to claim 5 in which the catalyst layer includes a transition metal or noble metal catalyst and the catalyst further includes an activator or promoter.

12. A method according to claim 11 in which the activator or promoter is present as a separate layer.

* * * * *